United States Patent [19]
Morrison

[11] Patent Number: 5,808,720
[45] Date of Patent: Sep. 15, 1998

[54] MODULAR UNIVERSAL EYEGLASS FRAME

[75] Inventor: James W. Morrison, Sarasota, Fla.

[73] Assignee: Morrison International, Inc., Sarasota, Fla.

[21] Appl. No.: 695,718

[22] Filed: Aug. 12, 1996

Related U.S. Application Data

[60] Continuation of Ser. No. 503,392, Jul. 17, 1995, abandoned, which is a division of Ser. No. 155,206, Nov. 22, 1993, Pat. No. 5,459,534.

[51] Int. Cl.$^6$ ................................................... G02C 5/04
[52] U.S. Cl. .................................................. 351/128; 351/41
[58] Field of Search ................................. 351/86, 83, 103, 351/106, 41, 128

[56] References Cited

U.S. PATENT DOCUMENTS 3,552,840  1/1971  Braget ........................................ 351/86

Primary Examiner—Hung X. Dang
Attorney, Agent, or Firm—Robert A. Green

[57] ABSTRACT

The disclosure is of an eyeglass frame having two lens receiving portions each having an annular channel in which a circular lens may be mounted. The annular channel includes a rear wall which faces the wearer and a front wall which faces someone who looks at the wearer of the frame. The frame includes an auxiliary wall which extends from the front wall of the channel and changes, for someone looking at the wearer of the frame, the circular appearance of a lens in the channel to another shape determined by the auxiliary wall.

20 Claims, 3 Drawing Sheets

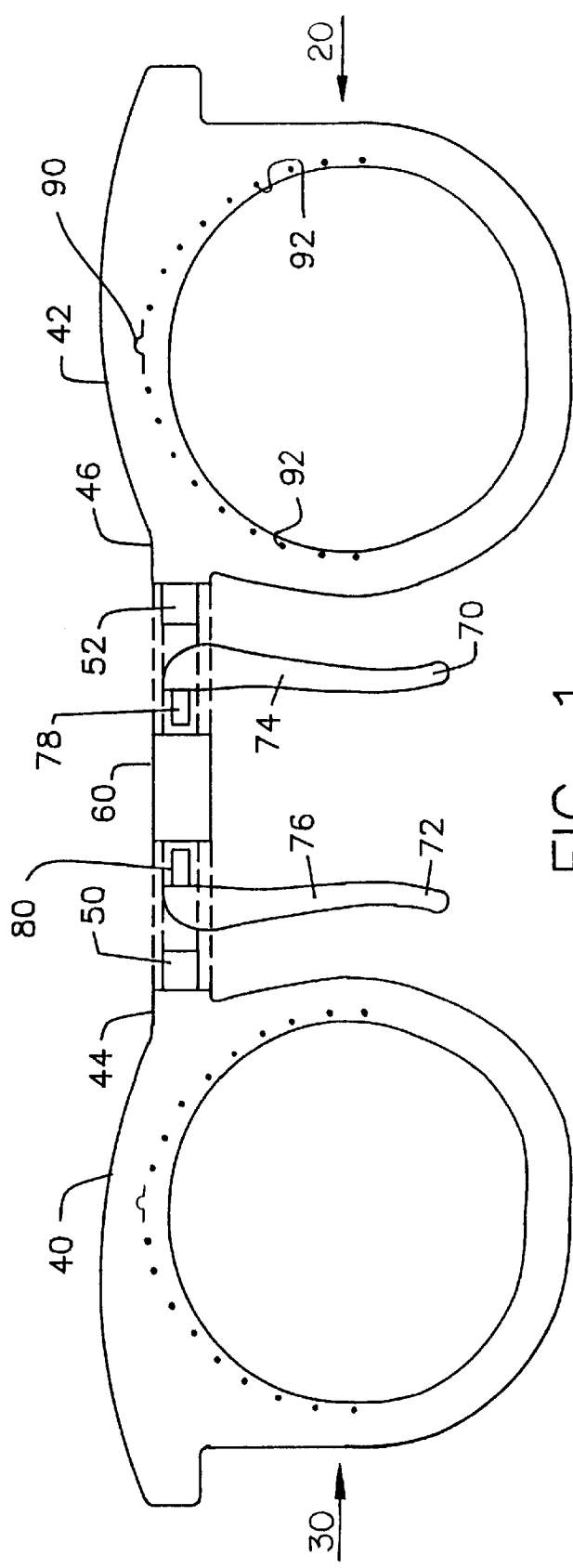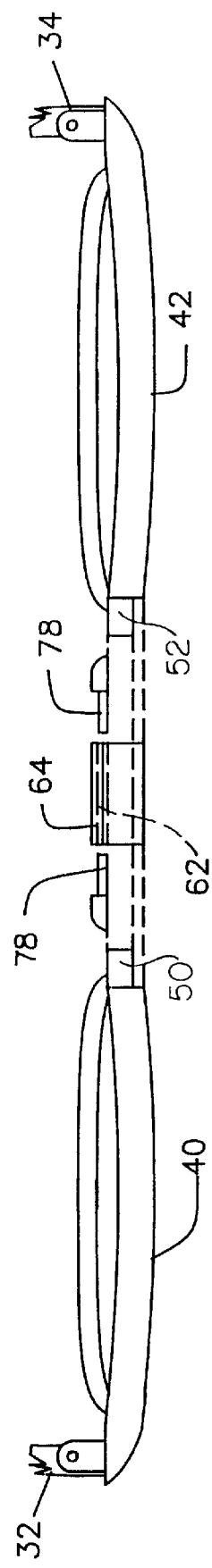

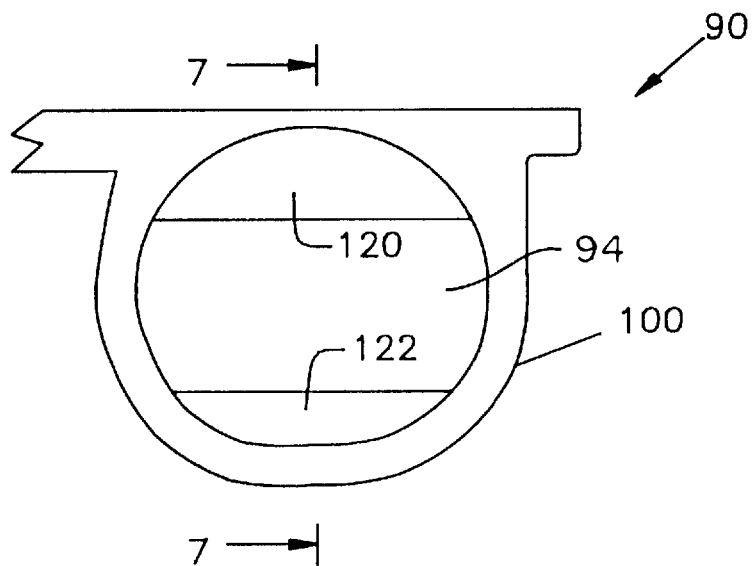
FIG. 6
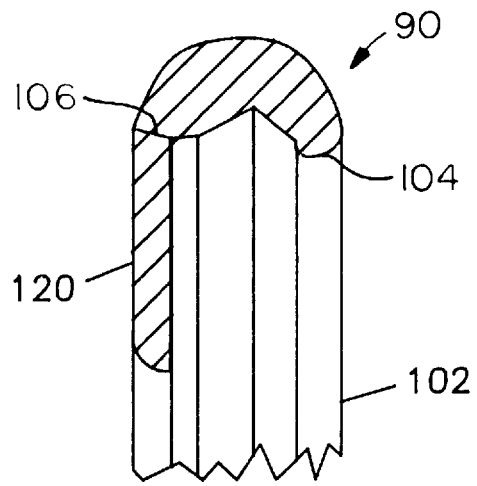
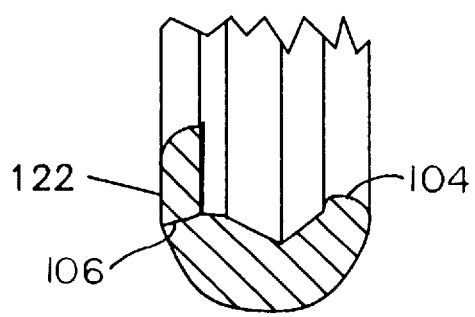
FIG. 7

MODULAR UNIVERSAL EYEGLASS FRAME

CROSS-REFERENCE TO RELATED APPLICATIONS

This application is a continuation of application Ser. No. 08/503,392 filed Jul. 17, 1995 now abandoned, as a division of application Ser. No. 08/155,206 filed Nov. 22, 1993 now U.S. Pat. No. 5,459,534.

BACKGROUND OF THE INVENTION

At the present time, commercially available eyeglass frames are made in standard sizes and shapes and cannot be adjusted to any great extent to accommodate the variations in face shapes and sizes and eye spacings and pupillary dimensions of different wearers. This is not a problem in civilized countries in which purveyors of frames have many different sizes and shapes readily available. However, in third world countries or in remote areas of any country a variety of eyeglasses and frames may not be available.

In addition, for a frame to have a distinct appearance, the frame and the lenses must be similarly shaped to provide the desired appearance. This can be a costly time consuming operation.

SUMMARY OF THE INVENTION

The present invention provides eyeglass frames which are completely adjustable in size and shape and which can accept circular lenses of different prescriptions while making the lenses appear to someone looking at the wearer as having an appearance other than circular.

DESCRIPTION OF THE DRAWINGS

FIG. 1 is a rear elevational view of a modular eyeglass frame embodying the invention;

FIG. 2 is a plan view of the frame of FIG. 1;

FIG. 6 is a front elevational view of a portion of a modified frame embodying the invention; and FIG. 7 is a sectional view along the lines 7—7 in FIG. 6.

DESCRIPTION OF THE INVENTION

Figure 3:
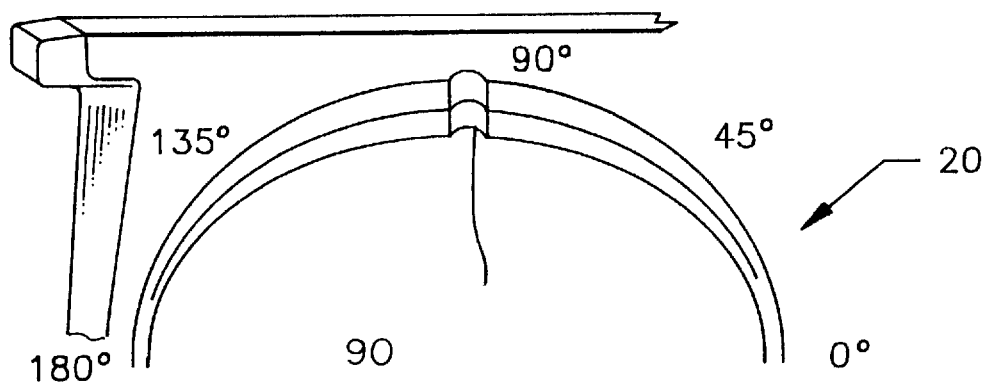
FIG. 3 is a perspective view of a portion of a modified frame embodying the invention.

FIG. 1 shows an eyeglass frame assembly 10 including left and right lens receiving portions 20 and 30, respectively, each of which has a temple 32, 34 secured thereto. The lens receiving portions are generally circular in shape. The right lens receiving portion 30 has an upper generally arcuate rim 40 and the left lens receiving portion has an upper generally arcuate rim 42.

The inner end 44 of the upper rim 40 of the right lens receiving portion 30 has a relatively short projecting pin 50 and the inner end 46 of the upper rim 42 of the left lens receiving portion 20 has a relatively short pin 52. The pins 50 and 52 are preferably aligned on a common axis, the horizontal axis.

The frame assembly 10 also includes a coupling member 60 which is a short tube having a through hole 62 dimensioned to receive the pins 50 and 52. The coupling member 60 also has a second through hole 64 adapted to receive left and right nose pieces 70 and 72, respectively, Each nose piece has a curved portion 74 and 76, respectively, which rests on the nose and the upper end of each nose piece carries a pin, 78 and 80, respectively, which enter the second through hole 64.

In using the invention, to fit a particular patient, the technician selects left and right lens receiving portions 20 and 30 and then he need only select a coupling member 60 to provide the required spacing of the nose pieces 70 and 72 and he assembles the nose pieces 70 and 72 and the lens receiving portions with the coupling member 60.

It is noted that off the shelf standard frames normally available in urban areas cannot have their lens receiving portions adjusted for different pupillary distances. The present invention permits such adjustment by proper selection of the size of the cylinder 60 whereby the lens receiving portions can be selectively spaced from each other.

Figure 4:
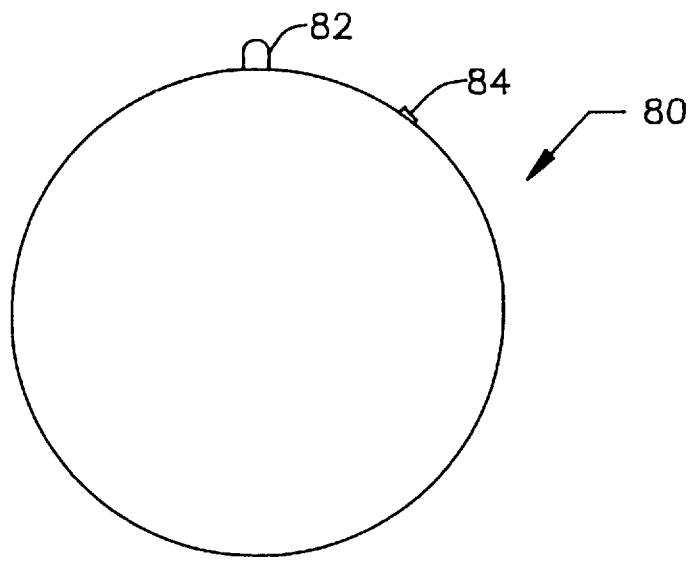
FIG. 4 is a front elevational view of a lens to be used with a frame embodying the invention.
Figure 5:
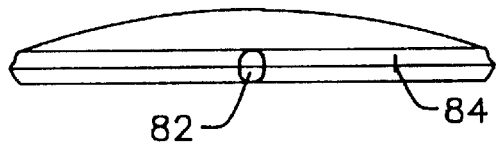
FIG. 5 is a side elevational view of the lens of FIG. 4.

In another aspect of the invention, an eyeglass frame is created to permit the positioning in the frame of lenses which must be rotated to correct for astigmatism. In this embodiment of the invention, the frame assembly 10 is intended for use with circular lenses 80 (FIGS. 4 and 5) which are molded and in the molding process are provided with a stub 82 positioned on a selected axis of the lens. The lens is also provided along its periphery with a degree marking 84 suitably positioned so that it can be used to position the lens in a frame as required.

In this case, the inner surface of the lens receiving portion 20 and 30 of the frame 10, facing the wearer, is provided with a notch 90 at 90 degrees and a plurality of degree markings 92 spaced apart every 10 or 15 degrees. With this arrangement, a cylinder lens 80 can be rotated to its proper axis and then fixed in place in the frame.

In a modification of the invention illustrated in FIGS. 6 and 7, a frame 90 is created to accept a circular lens 94 while providing, to the outside world, a non-circular lens opening which is more esthetic or stylish than a circular lens opening might be. In this modification, the lens receiving portion 100 of the frame includes an annular channel 102 in which a circular lens can be inserted. The channel 102 is defined or formed by an inner or rear wall 104 which faces the wearer and an outer wall 106 which is remote from the wearer.

In the prior art, as in Braget, U.S. Pat. No. 3,552,840, and in regular commercial practice, a lens and the lens opening in the frame have the same shape. Braget, shows a non circular lens in a correspondingly shaped non-circular channel in the frame. Both the lens and frame have the same shape. His teaching leads to the conclusion to have a different shape or appearance, both the lens and the frame have to be shaped in the manner desired. This is an expensive arrangement.

According to the invention, the front of the frame which faces the world is provided with lips or wall portions 120 and 122 which are secured to the outer wall 106 of the lens-receiving channel 102 and extend therefrom. The walls 120 and 122 make the lens opening non-circular as seen from the front. The portions 120 and 122 can have any desired shape or size to provide a desired lens opening as seen from the front by a viewer.

In addition only one wall 120 or 122 might be provided.

What is claimed is:

1. An eyeglass frame including a first lens receiving portion having a front surface and a rear surface, a second lens receiving portion having a front surface and a rear surface, said first and second lens receiving portions each having an opening and a channel defining said opening for receiving a particularly shaped lens, and an auxiliary wall secured to said front surface of each of said lens receiving portions and covering a portion of the opening therein to provide a specially shaped appearance of a lens when viewed from said front surface of said lens receiving portions.

2. The apparatus defined in claim 1 wherein said lenses and said lens receiving portions have substantially identical shapes.

3. The apparatus defined in claim 1 wherein said lenses and said lens lens receiving portions are generally circular and the lens receiving portions appear to a viewer to be non-circular.

4. An eyeglass frame including a first lens receiving portion having a front surface and a rear surface, a second lens receiving portion having a front surface and a rear surface, said first and second lens receiving portions each having an opening for receiving a specially shaped lens, said first and second lenses and their lens receiving portions having substantially the same shape, and means on said lens receiving portions covering a portion of each lens in each lens receiving portion and changing the shape of said lens receiving portion as seen by a viewer looking at the person wearing the frame so that the lens receiving portions of the frame appear to have a different shape than the lenses contained therein.

5. An eyeglass frame including a first lens receiving portion having a front surface and a rear surface, a second lens receiving portion having a front surface and a rear surface, said first and second lens receiving portions each having an opening for receiving a circularly shaped lens, and said front surface of each of said lens receiving portions including portions which cover a portion of the opening therein to provide a specially shaped appearance of a circular lens held therein when viewed from said front surface of said lens receiving portions.

6. An eyeglass frame including a first lens receiving portion having a front surface and a rear surface, a second lens receiving portion having a front surface and a rear surface, said first and second lens receiving portions having generally circular openings for receiving a circular lens, and said front surface of said lens receiving portions including portions which cover a portion of the circular opening therein to provide a non-circular appearance when viewed from said front surface of said lens receiving portions.

7. An eyeglass frame including a first circular lens receiving portion having a front surface and a rear surface and having a circular channel for receiving a circular lens, a second circular lens receiving portion having a front surface and a rear surface and having a circular channel for receiving a circular lens, a non-circular auxiliary wall secured to said front surface of said first lens receiving portion, and a non-circular auxiliary wall secured to said front surface of said send lens receiving portion whereby said frame appears to a viewer looking at the frame to have non-circular lens receiving portions.

8. An eyeglass frame including first and second lens receiving portions each having a lens receiving channel, said lens receiving portions and the channels therein being circular and a non-circular wall secured to each lens receiving portion to provide a non-circular appearance to said frame and lenses.

9. An eyeglass frame including a first lens receiving portion having a front surface and a rear surface, a second lens receiving portion having a front surface and a rear surface, said first and second lens receiving portions each having an opening for receiving a particularly shaped lens, and said front surface of each of said lens receiving portions including an auxiliary wall which covers a portion of the opening therein to provide a specially shaped appearance of a lens when viewed from said front surface of said lens receiving portions.

10. An eyeglass frame including a first lens receiving portion having a front surface and a rear surface, a second lens receiving portion having a front surface and a rear surface, said first and second lens receiving portions each having an opening for receiving a specialy shaped lens, and means on said lens receiving portions covering a portion of each lens in each lens receiving portion so that the shape of the lens is changed when a viewer looks at the person wearing the frame.

11. An eyeglass frame including a first lens receiving portion having a front surface and a rear surface, a second lens receiving portion having a front surface and a rear surface, said first and second lens receiving portions each having an opening for receiving a circularly shaped lens, and said front surface of each of said lens receiving portions including portions which cover a portion of the opening therein to provide a specially shaped appearance of a circular lens held therein when viewed from said front surface of said lens receiving portions.

12. An eyeglass frame including a first lens receiving portion having a front surface and a rear surface, a second lens receiving portion having a front surface and a rear surface, said first and second lens receiving portions having generally circular openings for receiving a circular lens, and said front surface of said lens receiving portions including portions which cover a portion of the circular opening therein to provide a non-circular appearance when viewed from said front surface of said lens receiving portions.

13. An eyeglass frame including a first lens receiving portion having a front surface and a rear surface, a second lens receiving portion having a front surface and a rear surface, said first and second lens receiving portions each having an opening for receiving a specially shaped lens and an upper portion and a lower portion, and wall means on the front surfaces of said lens receiving portions and extending from said upper portions thereof and covering a portion of each lens in each lens receiving portion so that the shape of the lens is changed when a viewer looks at the person wearing the frame.

14. An eyeglass frame including a ring-like first lens receiving portion having an opening in which a lens can be inserted, the ring-like structure of said first lens receiving portion having an upper portion and a lower portion connected by intermediate portions, a ring-like second lens receiving portion having an opening in which a lens can be inserted, the ring-like structure of said second lens receiving portion having an upper portion and a lower portion connected by intermediate portions, said first and second lens receiving portions having outer surfaces which face away from the wearer of the eyeglass frame and inner surfaces which face the wearer of the eyeglass frame, a first wall secured to said outer surface of said first lens receiving portion and extending from said upper portion thereof downwardly to cover a portion of said first lens receiving portion and thereby change the appearance of the opening in said first lens receiving portion, and a second wall secured to said outer surface of said second lens receiving portion and extending from said upper portion thereof downwardly to cover a portion of said second lens receiving portion and thereby change the appearance of the opening in said second lens receiving portion.

15. The eyeglass frame defined in claim 14 wherein said openings in said lens receiving portions are circular in shape and can thus receive a circular lens of simple form.

16. The method of making an inexpensive pair of eyeglasses comprising the steps of providing a frame having first and second lens receiving portions each having a circular opening for receiving a simple, mass produced circular lens, said first and second lens receiving portions having front and rear surfaces, the rear surface facing the wearer and the front surface being away from the wearer, said lens receiving portions having an upper edge and a lower edge, and providing a wall secured to the outer surface of the upper edge of each lens receiving portion and extending downwardly therefrom to cover a portion of the lens seated therein and thereby to render the appearance of the lens as non-circular.

17. An eyeglass frame including a first annular lens receiving portion having a front wall and a rear wall and containing an annular channel defined by said front wall and said rear wall for receiving a lens and holding the lens in place, a second annular lens receiving portion having a front wall and a rear wall and containing an annular channel defined by said front wall and said rear wall for receiving a lens and holding the lens in place, said first and second annular lens receiving portions each having an upper portion which normally lies adjacent to the brow of the wearer, an intermediate portion and a lower portion which is generally opposite to the upper portion, the shape of the lens in each annular channel being determined by the shape of the annular channel and the lens receiving portion as seen by a viewer looking at the front surface of each lens receiving portion, and an auxiliary wall secured to the upper portions of the front walls of each of the lens receiving portions and extending downwardly therefrom to change the shape of the lens in each lens receiving portion as seen by a viewer looking at the wearer of the frame, the viewer seeing the wall and a portion of each lens receiving portion as defining the shape of the lens therein, whereby, to an individual looking at the person wearing the frame, the shape of the lenses in the first and second lens receiving portions is different from the shapes of the lenses themselves.

18. An eyeglass frame including a first lens receiving portion having a front surface and a rear surface and shaped to provide a generally U-shaped annular channel for receiving a lens, a second lens receiving portion having a front surface and a rear surface and shaped to provide a generally U-shaped annular channel for receiving a lens, the front surface of each lens receiving portion facing away from the wearer of the frame and the rear surface of each lens receiving portion facing the wearer of the frame, said first lens receiving portion being generally annular and having an upper portion which contains the upper portion of the annular channel threrein, said second lens receiving portion being generally annular and having an upper portion which contains the upper portion of the annular channel therein, and a first wall on the front surface of said lens receiving portions and extending across said first lens receiving portion and extending downwardly from said upper portion thereof and spaced from the lens therein and covering a portion of each lens in each lens receiving portion so that the shape of the lens, as seen by a viewer looking at the frame, is determined in part by said wall when a viewer looks at the person wearing the frame.

19. An eyeglass frame including a ring-like first lens receiving portion having an opening including an annular channel in which a lens can be inserted, the ring-like structure of said first lens receiving portion having an upper portion and a lower portion connected by intermediate portions, a ring-like second lens receiving portion having an opening including an annular channel in which a lens can be inserted, the ring-like structure of said second lens receiving portion having an upper portion and a lower portion connected by intermediate portions, said first and second lens receiving portions having outer surfaces which face away from the wearer of the eyeglass frame and inner surfaces which face the wearer of the eyeglass frame, a first auxiliary wall secured to said outer surface of said first lens receiving portion and extending from said upper portion thereof downwardly to cover a portion of said first lens receiving portion and thereby change the appearance of the opening in said first lens receiving portion, and a second auxiliary wall secured to said outer surface of said second lens receiving portion and extending from said upper portion thereof downwardly to cover a portion of said second lens receiving portion and thereby change the appearance of the opening in said second lens receiving portion.

20. An eyeglass frame including a first portion for receiving a lens and a second portion for receiving a lens, each of said first and second portions including a first generally circular channel for holding a lens, said channel having two spaced apart walls, one wall being a viewer wall and the other being a wearer wall, a lens being seated between the viewer and wearer walls, the viewer wall facing the viewer of the frame when worn by a person, and the wearer wall facing the wearer of the frame, and an auxiliary wall secured to each of said first and second portions adjacent to and overlying a portion of said viewer wall and facing a viewer of said frame, whereby said auxiliary wall changes the appearance of said viewer wall to a viewer, a viewer viewing said frame seeing said auxiliary wall and a portion of said viewer wall.

* * * * *